(12) United States Patent
Hirose et al.

(10) Patent No.: US 12,194,724 B2
(45) Date of Patent: Jan. 14, 2025

(54) HEAT DISSIPATION SHEET AND METHOD OF MANUFACTURING HEAT DISSIPATION SHEET

(71) Applicant: FUJITSU LIMITED, Kawasaki (JP)

(72) Inventors: Shinichi Hirose, Yokohama (JP); Daiyu Kondo, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 231 days.

(21) Appl. No.: 16/952,130

(22) Filed: Nov. 19, 2020

(65) Prior Publication Data

US 2021/0172690 A1 Jun. 10, 2021

(30) Foreign Application Priority Data

Dec. 5, 2019 (JP) ................... 2019-220613

(51) Int. Cl.
*B32B 7/12* (2006.01)
*B32B 7/06* (2019.01)
*B32B 3/08* (2006.01)

(52) U.S. Cl.
CPC ............... *B32B 7/12* (2013.01); *B32B 7/06* (2013.01); *B32B 3/085* (2013.01); *B32B 2262/106* (2013.01); *B32B 2307/302* (2013.01); *B32B 2307/732* (2013.01)

(58) Field of Classification Search
CPC .. B32B 7/12; B32B 7/06; B32B 3/085; B32B 2262/106; B32B 2307/302; B32B 2307/732
USPC ..................................................... 428/195.1
See application file for complete search history.

(56) References Cited

U.S. PATENT DOCUMENTS

| | | |
|---|---|---|
| 2010/0172101 A1 | 7/2010 | Yao et al. |
| 2011/0030938 A1 | 2/2011 | Liu et al. |
| 2015/0030797 A1 | 1/2015 | Seo et al. |
| 2016/0130493 A1 | 5/2016 | Hirose et al. |
| 2018/0061736 A1 | 3/2018 | Hirose et al. |
| 2020/0047436 A1 | 2/2020 | Maruyama et al. |
| 2020/0095472 A1 | 3/2020 | Koga et al. |

(Continued)

FOREIGN PATENT DOCUMENTS

| | | |
|---|---|---|
| EP | 2546871 A1 | 1/2013 |
| JP | 2002-093969 A | 3/2002 |
| JP | 2011-35403 A | 2/2011 |

(Continued)

OTHER PUBLICATIONS

JP 2017228563 A, Heat Dissipation Sheet, Manufacturing Method Of Heat Dissipation Sheet, And Electronic Device (Year: 2017).*

(Continued)

*Primary Examiner* — Betelhem Shewareged
(74) *Attorney, Agent, or Firm* — Fujitsu Intellectual Property Center

(57) ABSTRACT

A heat dissipation sheet includes a carbon material layer configured to include a plurality of linear carbon materials arranged in parallel with each other, an adhesive resin layer configured to include a first surface to be in contact with an end of each of the plurality of linear carbon materials, a thickness of the adhesive resin layer being less than 1 μm, and a release sheet configured to be in contact with a second surface among a plurality of surfaces of the adhesive resin layer, the second surface being over a side opposite to the first surface.

6 Claims, 21 Drawing Sheets

(56) References Cited

U.S. PATENT DOCUMENTS

2021/0172690 A1\* 6/2021 Hirose ..................... B32B 7/06

FOREIGN PATENT DOCUMENTS

| JP | 2015-514822 A | 5/2015 | | |
|---|---|---|---|---|
| JP | 2016-92334 A | 5/2016 | | |
| JP | 2017228563 A | \* 12/2017 | ........... | H01L 23/373 |
| JP | 2018-32764 A | 3/2018 | | |
| JP | 2018-171809 A | 11/2018 | | |
| WO | 2018/110255 A1 | 6/2018 | | |

OTHER PUBLICATIONS

Taiwanese Patent Office Action mailed Jun. 17, 2017 for corresponding Taiwanese Patent Application No. 109139377, with English Translation, 14 pages.
Extended European Search Report dated Mar. 25, 2021 for corresponding European Patent Application No. 20208044.6, 7 pages.
European Office Action dated Jan. 11, 2023 for corresponding European Patent Application No. 20208044.6, 4 pages.
Japanese Office Action mailed Apr. 25, 2023 for corresponding Japanese Patent Application No. 2019-220613, with23 with English Translation, 9 pages.
Chinese Office Action dated Jul. 30, 2023 for corresponding Chinese Patent Application No. 202011373405.1, with English Translation, 21 pages.

\* cited by examiner

HEAT DISSIPATION SHEET AND METHOD OF MANUFACTURING HEAT DISSIPATION SHEET

CROSS-REFERENCE TO RELATED APPLICATION

This application is based upon and claims the benefit of priority of the prior Japanese Patent Application No. 2019-220613, filed on Dec. 5, 2019, the entire contents of which are incorporated herein by reference.

FIELD

Embodiments discussed herein are related to a heat dissipation sheet and a method of manufacturing a heat dissipation sheet.

BACKGROUND

In the related art, a transfer sheet (heat dissipation sheet) for transferring a heat conductive material layer made of a carbon material to a member having a heat generating portion is known (for example, refer to International Publication Pamphlet No. WO 2018/110255). The transfer sheet disclosed in International Publication Pamphlet No. WO 2018/110255 has a structure in which a release layer made of a release film, a first adhesive layer, a heat conductive material layer, and a second adhesive layer are laminated in this order.

SUMMARY

According to an aspect of the embodiments, a heat dissipation sheet includes a carbon material layer configured to include a plurality of linear carbon materials arranged in parallel with each other, an adhesive resin layer configured to include a first surface to be in contact with an end of each of the plurality of linear carbon materials, a thickness of the adhesive resin layer being less than 1 µm, and a release sheet configured to be in contact with a second surface among a plurality of surfaces of the adhesive resin layer, the second surface being over a side opposite to the first surface.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
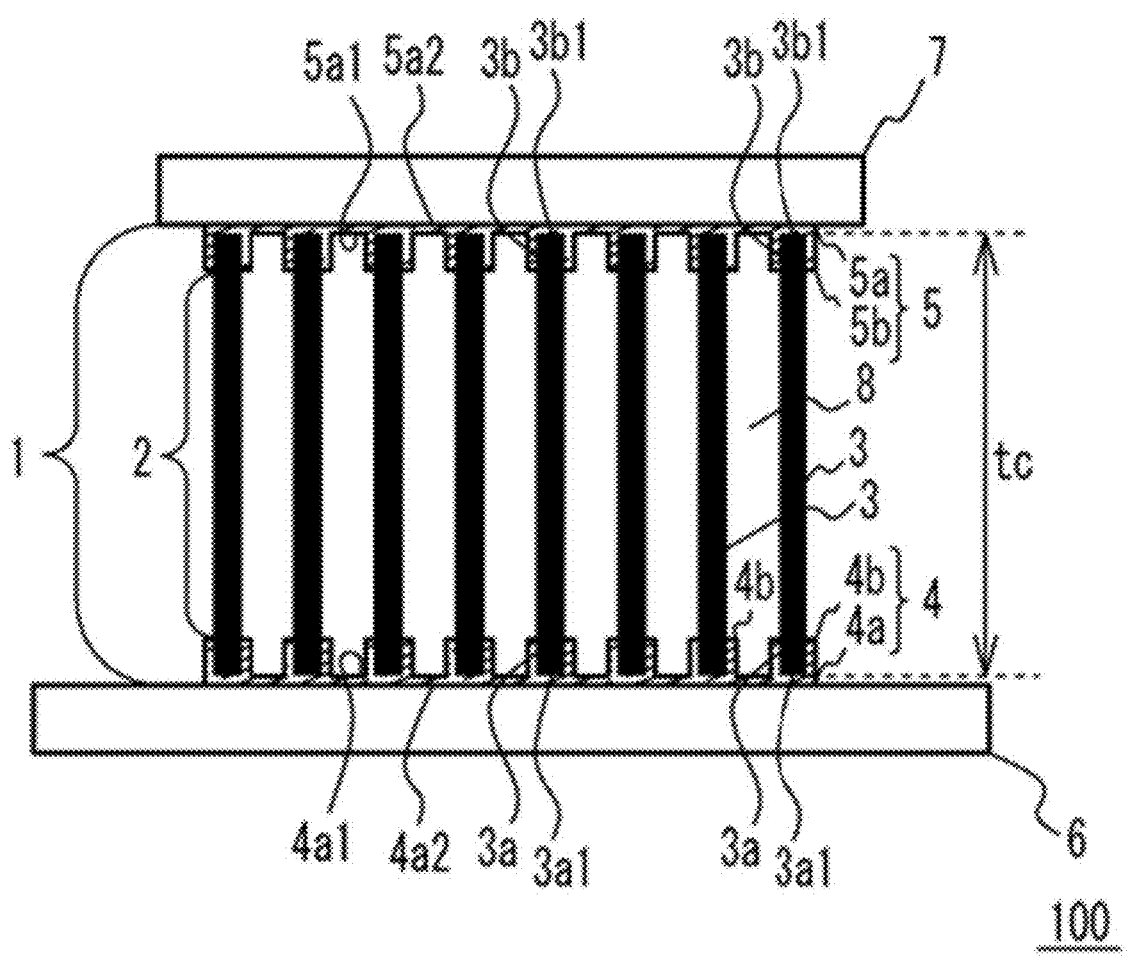
FIG. 1 is an explanatory diagram of a heat dissipation sheet of an embodiment.

A heat dissipation sheet is demanded to have favorable thermal conductivity between a heating element such as a semiconductor chip and a heat dissipation element such as a heat spreader, and have adhesiveness for fixing the heat dissipation element to the heating element. The transfer sheet disclosed in International Publication Pamphlet No.

WO 2018/110255 has room for improvement in terms of achieving both favorable thermal conductivity and adhesiveness.

Hereinafter, an embodiment of a technique for ensuring adhesiveness to a heating element and a heat dissipation element and thermal conductivity between the heating element and the heat dissipation element will be described with reference to the accompanying drawings. In the drawings, the dimensions, ratios, or the like of parts are occasionally not illustrated to be completely consistent with those of the actual parts. In some drawings, for convenience of description, elements actually present are omitted or the elements are exaggerated in dimensions compared to the actual elements.

Embodiment

A heat dissipation sheet 100 of an embodiment will be described with reference to FIGS. 1 to 3. The heat dissipation sheet 100 includes a heat dissipation sheet body 1, a first release sheet 6 provided on one surface side of the heat dissipation sheet body 1, and a second release sheet 7 provided on the other surface side of the heat dissipation sheet body 1. The heat dissipation sheet 100 is disposed between a heating element 31 (refer to FIG. 21) represented by an electronic component that generates heat, such as a central processing unit (CPU), and a heat dissipation element 32 (refer to FIG. 21) represented by a heat spreader, joins the heating element 31 and the heat dissipation element 32, and conducts heat between the heating element 31 and the heat dissipation element 32. A method for using the heat dissipation sheet 100 will be described later.

The heat dissipation sheet body 1 includes a carbon nanotube layer (hereinafter referred to as a "CNT layer") 2 as a carbon material layer. The CNT layer 2 is formed by gathering a plurality of carbon nanotubes (hereinafter referred to as "CNTs") 3 as a plurality of linear carbon materials into a sheet shape. Since the plurality of CNTs 3 extend substantially in the same direction, the CNT layer may be formed by planarly spreading the plurality of CNTs 3 in a sheet shape. The CNT 3 may be a single layer or a multilayer. The surface density of the CNTs 3 is $1 \times 10^{10}$ pieces/cm$^2$ or more. This is in consideration of heat dissipation and electrical conductivity. In particular, the surface density of the CNTs 3, for example, the number of CNTs 3 depends on the amount of paths for heat dissipation and electrical conduction, and as the number of CNTs 3 is increased, the heat dissipation and electrical conductivity become more dominant. The heat dissipation sheet 100 of the present embodiment is used for heat conduction between the heating element 31 and the heat dissipation element 32, but by setting the surface density of the CNTs 3 to be $1 \times 10^{10}$ pieces/cm$^2$ or more, characteristics suitable for this use may be provided.

In each drawing, the interval between the CNTs 3 is drawn to be substantially uniform, but in reality, since the CNTs 3 grow randomly, the distance between the adjacent CNTs 3 may not be uniform.

The length of each CNT 3 is substantially equal to the thickness tc of the CNT layer 2. The thickness tc may be appropriately set according to the use of the heat dissipation sheet 100, and may be set in a range of approximately 100 μm to 500 μm.

In the CNT layer 2, a gap 8 is formed between the adjacent CNTs 3. This improves the contractility of the CNT layer 2. For example, the CNT layer 2 easily follows the expansion and contraction of the heat dissipation sheet 1 caused by a thermal cycle in which the rise and fall of the temperature are repeated.

Each linear CNT 3 has a first end 3a, and a second end 3b located on a side opposite to the first end 3a. A first end surface 3a1 is formed at the first end 3a, and a second end surface 3b1 is formed at the second end 3b.

Figure 2:
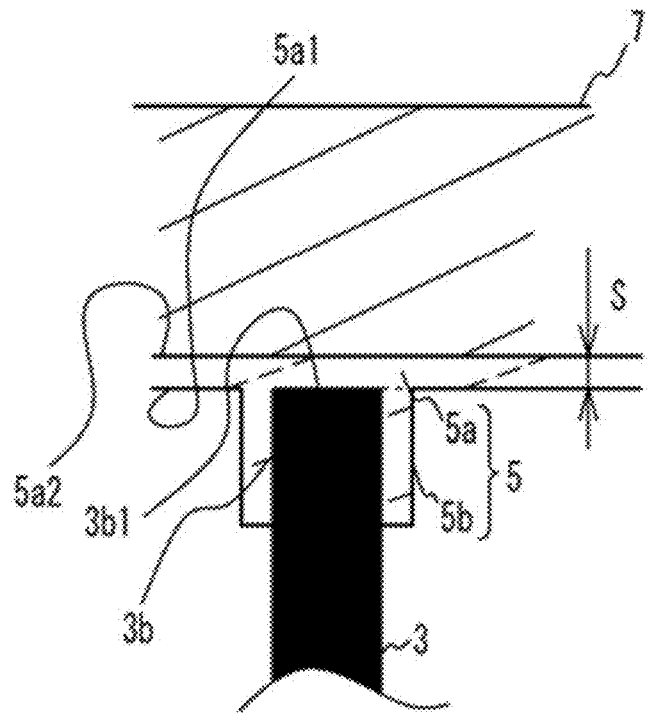
FIG. 2 is an explanatory diagram illustrating an end of linear carbon material (CNT) in an enlarged manner.
Figure 2:
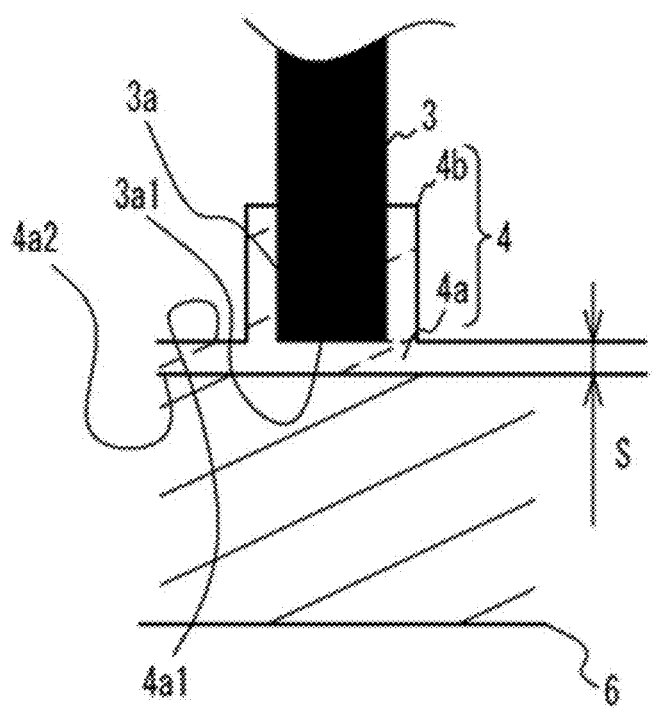
Figure 3:
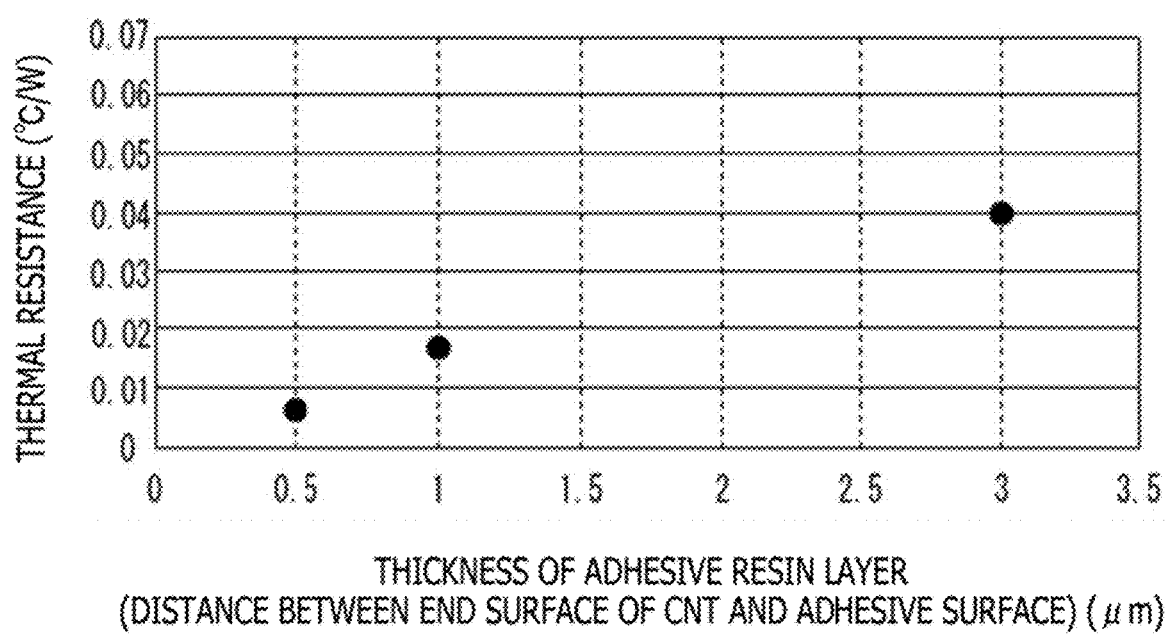
FIG. 3 is a graph illustrating dependency of a thermal resistance of a heat dissipation sheet on a thickness of an adhesive resin layer.

Referring to FIG. 2, a first adhesive resin 4 is provided on the first end 3a side. The first adhesive resin 4 may be an epoxy resin. The first adhesive resin 4 includes a first adhesive resin layer 4a, and an embedded portion 4b continuous with the first adhesive resin layer 4a. The first adhesive resin layer 4a has a first surface, and a second surface on a side opposite to the first surface. The first surface is a first holding surface 4a1 for holding each CNT 3, and the embedded portion 4b is provided at the first holding surface 4a1. The first end 3a (first end surface 3a1) of each CNT 3 is in contact with the first holding surface 4a1, and the embedded portion 4b is provided around the first end 3a so that the first end 3a is embedded. In this manner, each CNT 3 is held by the first adhesive resin 4, and each CNT 3 and the first adhesive resin 4 are firmly integrated. The second surface of the first adhesive resin layer 4a is a first adhesive surface 4a2. The first adhesive surface 4a2 is located on a side opposite to the embedded portion 4b, and the first release sheet 6 is attached to the first adhesive surface 4a2 when the heat dissipation sheet 100 is in an unused state, for example, when the heat dissipation sheet 100 is for sale. The first release sheet 6 is a film-like member, and is peeled off in the use state of the heat dissipation sheet 100, and the first adhesive surface 4a2 is bonded to the heating element 31 or the heat dissipation element 32 (refer to FIG. 21).

Referring to FIG. 2, a second adhesive resin 5 is provided on the second end 3b side. As with the first adhesive resin 4, the second adhesive resin 5 may be an epoxy resin. The second adhesive resin 5 includes a second adhesive resin layer 5a, and an embedded portion 5b continuous with the second adhesive resin layer 5a. The second adhesive resin layer 5a has a third surface, and a fourth surface on a side opposite to the third surface. The fourth surface is a second holding surface 5a1 for holding each CNT 3, and the embedded portion 5b is provided at the second holding surface 5a1. The second end 3b (second end surface 3b1) of each CNT 3 is in contact with the second holding surface 5a1, and the embedded portion 5b is provided around the second end 3b so that the second end 3b is embedded. In this manner, each CNT 3 is held by the second adhesive resin 5, and each CNT 3 and the second adhesive resin 5 are firmly integrated. The third surface of the second adhesive resin layer 5a is a second adhesive surface 5a2. The second adhesive surface 5a2 is located on a side opposite to the embedded portion 5b, and the second release sheet 7 is attached to the second adhesive surface 5a2 when the heat dissipation sheet 100 is in an unused state, for example, when the heat dissipation sheet 100 is for sale. The second release sheet 7 is a film-like member, and is peeled off in the use state of the heat dissipation sheet 100, and the second adhesive surface 5a2 is bonded to the heating element 31 or the heat dissipation element 32 (refer to FIG. 21).

The thickness S of the first adhesive resin layer 4a is less than 1 μm. Since the first adhesive resin layer 4a is present, the thickness S does not become 0 μm. A state in which the thickness S of the first adhesive resin layer 4a is 0 μm means a state in which the first end surface 3a1 is exposed to the first adhesive surface 4a2. When the first end surface 3a1 is exposed to the first adhesive surface 4a2, the adhesiveness is affected. Therefore, it is not desirable that the first end surface 3a1 is exposed to the first adhesive surface 4a2. Thus, in the present embodiment, the thickness S of the first adhesive resin layer 4a is made not to be 0 µm.

On the other hand, the thickness S of the first adhesive resin layer 4a is preferably as thin as possible from the viewpoint of improving thermal conductivity. With reference to FIG. 3, the dependency of the thermal resistance of the heat dissipation sheet 100 on the thickness of the adhesive resin layer will be described. Referring to FIG. 3, it may be seen that the thermal resistance is increased as the thickness of the adhesive resin layer is increased. Therefore, the thickness S of the adhesive resin layer is desirably as thin as possible. Thus, in the present embodiment, the thickness S is less than 1 µm. The thickness S of the adhesive resin layer is preferably as thin as possible, and is preferably set in a range of 200 nm to 800 nm. The thickness S of the adhesive resin layer may also be referred to as a distance between the end surface of each CNT and the adhesive surface of the adhesive resin layer.

Similarly, the thickness S of the second adhesive resin layer 5a is 1 µm, and the thickness S is made not to be 0 µm. Since the properties demanded for the second adhesive resin layer 5a are the same as those of the first adhesive resin layer 4a, detailed description thereof will be omitted.

In the present embodiment, the CNT layer 2 using the CNTs 3 is provided. Each CNT 3 is a material having very high heat conductivity (1500 to 3000 W/m·K) as well as excellent flexibility and heat resistance, and has properties suitable for a heat dissipation material. In the present embodiment, high thermal conductivity is achieved by adopting such a CNT 3 and setting the thickness S of each of the first adhesive resin layer 4a and the second adhesive resin layer 5a to be less than 1 µm. Since the first end surface 3a1 of the CNT 3 is not exposed to the first adhesive surface 4a2 and similarly, the second end surface 3b1 is not exposed to the second adhesive surface 5a2, the adhesiveness of each adhesive surface is ensured.

Referring to FIGS. 4 to 14, an example of a method for manufacturing the heat dissipation sheet 100 of the embodiment will be described.

Figure 4:
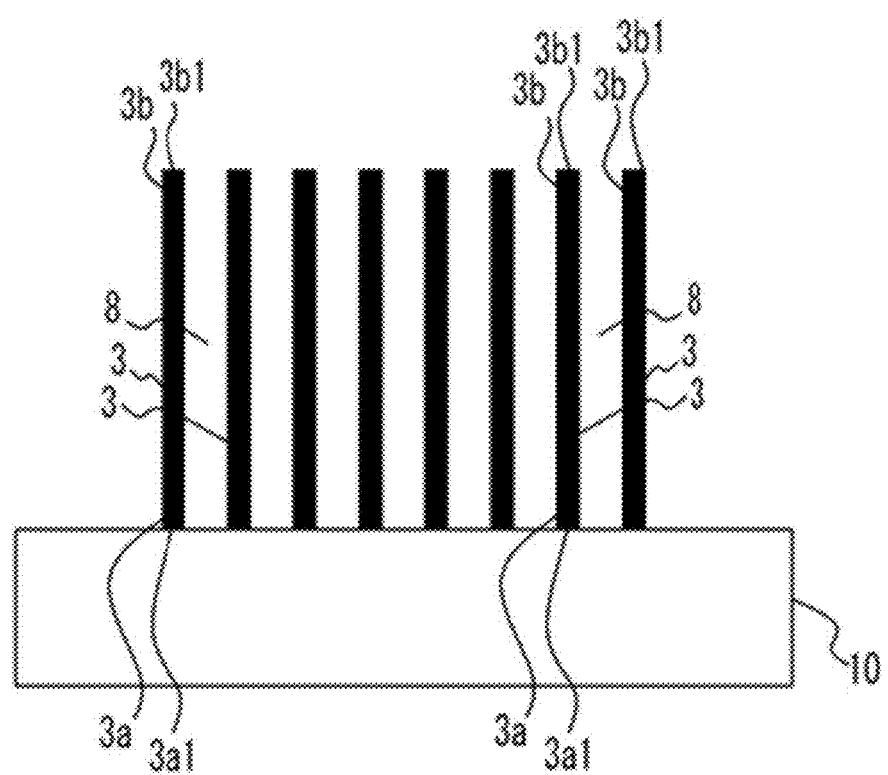
FIG. 4 is an explanatory diagram illustrating a step of forming a plurality of linear carbon materials over a first substrate.

As illustrated in FIG. 4, a plurality of CNTs 3 are formed over a first substrate 10. Each CNT 3 has the first end 3a on the first substrate 10 side and the second end 3b on the opposite side. In the present embodiment, a silicon substrate is used as the first substrate 10. As the first substrate 10, a semiconductor substrate such as a silicon substrate, an alumina (sapphire) substrate, a magnesium oxide (MgO) substrate, a glass substrate, a metal substrate such as a stainless steel substrate, stainless steel foil, aluminum foil, or the like may be used. A thin film may be formed over the substrate. For example, a silicon substrate over which a silicon oxide film having a film thickness of about 300 nm is formed may be used. The first substrate 10 is peeled off after the CNT 3 is formed. For this purpose, it is desirable that the first substrate 10 does not change in quality at the formation temperature of the CNT 3, and at least the surface of the first substrate 10 which is in contact with the first end 3a of the CNT 3 is made of a material that may be easily peeled off from the CNT 3. Alternatively, the first substrate 10 may be made of a material that may be selectively etched with respect to the CNT 3.

On the first substrate 10, by sputtering, an Al (aluminum) film having a film thickness of 1.0 nm is formed and a Fe (iron) film having a film thickness of 2.5 nm is formed, thereby forming a catalyst metal film made of Fe on the Al film as a base. Methods other than sputtering may be adopted, and the film thickness is not limited to 2.5 mm. In addition to Fe, Co (cobalt), Ni (nickel), Au (gold), Ag (silver), Pt (platinum), or an alloy containing at least one of these materials may be used as the catalyst metal. As the catalyst, in addition to the metal film, metal fine particles prepared by controlling the size in advance using a differential mobility analyzer (DMA) or the like may be used. Also in this case, the metal species may be the same as that of the thin film. As a base film of these catalyst metals, a film formed of Mo (molybdenum), Ti (titanium), Hf (hafnium), Zr (zirconium), Nb (niobium), V (vanadium), TaN (tantalum nitride), $TiSi_x$ (titanium silicide), Al, $Al_2O_3$ (aluminum oxide), $TiO_x$ (titanium oxide), Ta (tantalum), W (tungsten), Cu (copper), Au (gold), Pt (platinum), Pd (palladium), or TiN (titanium nitride), or a film formed of an alloy containing at least one of these materials may be formed. For example, a laminated structure of Fe (2.5 nm)/Al (10 nm), a laminated structure of Co (2.6 nm)/TiN (5 nm), or the like may be applied. In a case of using metal fine particles, for example, a laminated structure of Co (average diameter 3.8 nm)/TiN (5 nm) may be applied.

Next, the CNT 3 is grown over the substrate by, for example, hot filament CVD using the catalyst metal film as the catalyst. The growth conditions for the CNT 3 are that, for example, a mixed gas of acetylene and argon (partial pressure ratio 1:9) is used as a source gas, the total gas pressure in a film forming chamber is 1 kPa, the hot filament temperature is 1000° C., and the growth time is 20 minutes. In this manner, multi-layered CNTs 3 having 3 to 6 layers (about 4 layers on average), a diameter of 4 to 8 nm (6 nm on average), and a length of 80 µm (growth rate: 4 µm/min) may be grown. The CNT 3 may be formed by other methods for film formation such as thermal CVD or remote plasma CVD. The CNT 3 to be grown may be a single layer. In addition to acetylene, hydrocarbons such as methane and ethylene, alcohols such as ethanol and methanol, and the like may be used as the carbon raw material.

In this manner, a plurality of carbon nanotubes oriented substantially perpendicular to the surface of the first substrate 10 are formed over a region of the first substrate 10 where the catalyst metal film is formed. Under the above-described growth conditions, the surface density of the CNTs 3 was about $1 \times 10^{10}$ pieces/cm². The gap 8 was formed between the adjacent CNTs 3.

A portion apart from the first substrate 10 is the second end 3b, and a tip portion thereof is the second end surface 3b1. Due to the growth mechanism of the CNTs 3, the tip ends of the CNTs 3 may be mixed in the lateral direction, and in this case, a portion farthest from the first substrate 10 is defined as the second end surface 3b1.

Figure 5:
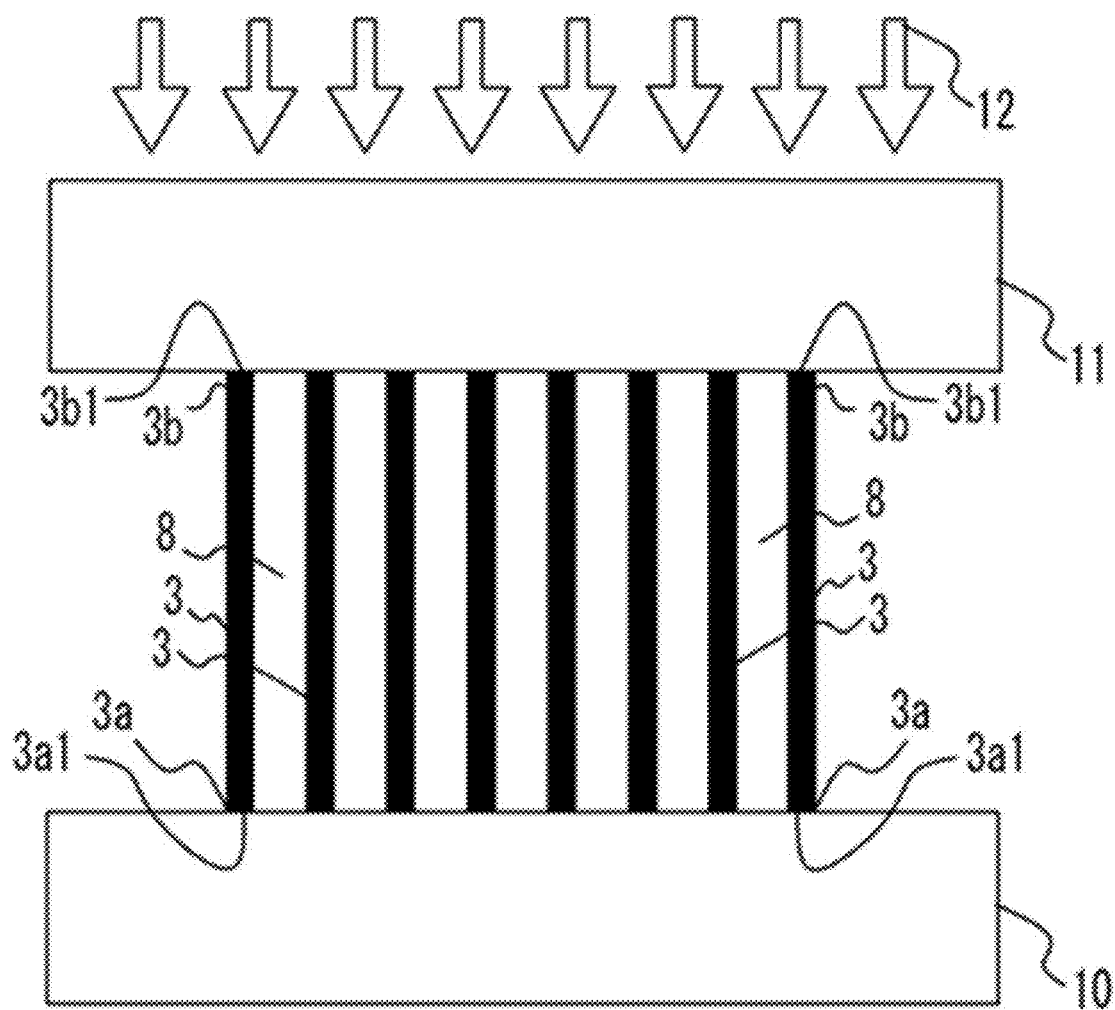
FIG. 5 is an explanatory diagram illustrating a state in which a transfer member is pressed against a second end of each of the plurality of linear carbon materials.

Referring to FIG. 5, a transfer member 11 is brought into contact with the second end surface 3b1 of each second end 3b of the CNTs 3 grown over the first substrate 10, and is pressed toward the first substrate 10 as indicated by arrows 12. The transfer member 11 in the present embodiment is a silicone rubber sheet, but other materials such as natural rubbers and synthetic rubbers may be used as the transfer member as long as the material may transfer the CNTs 3.

Figure 6A:
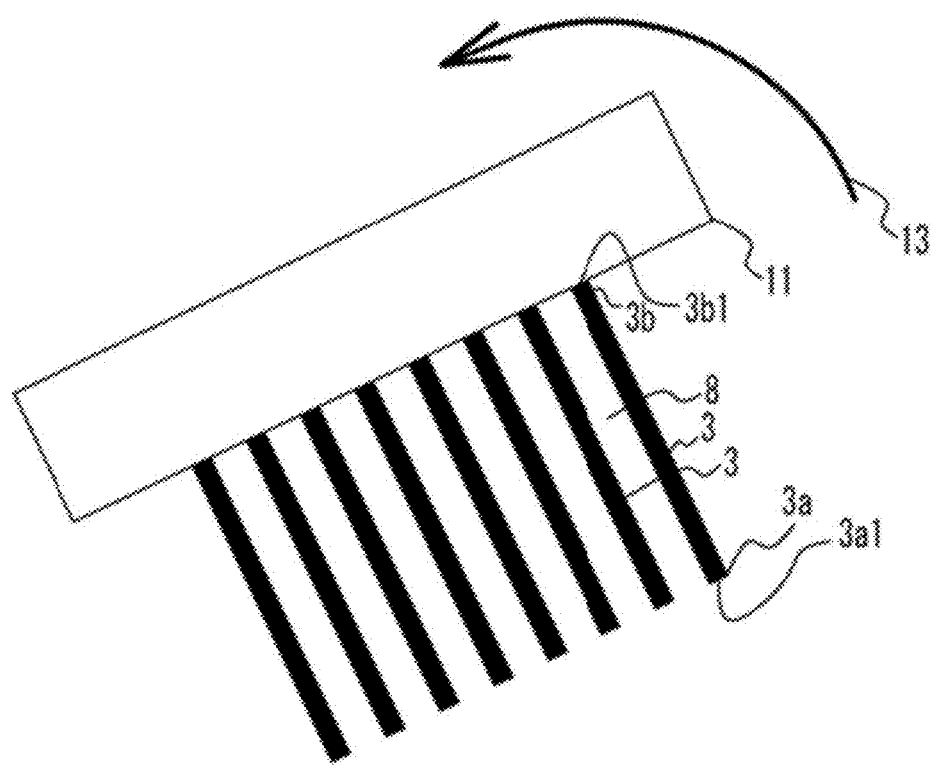
FIGS. 6A and 6B are explanatory diagrams illustrating a step of transferring the plurality of linear carbon materials to the transfer member.
Figure 6A:
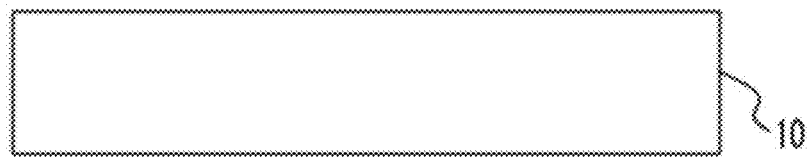
Figure 6B:
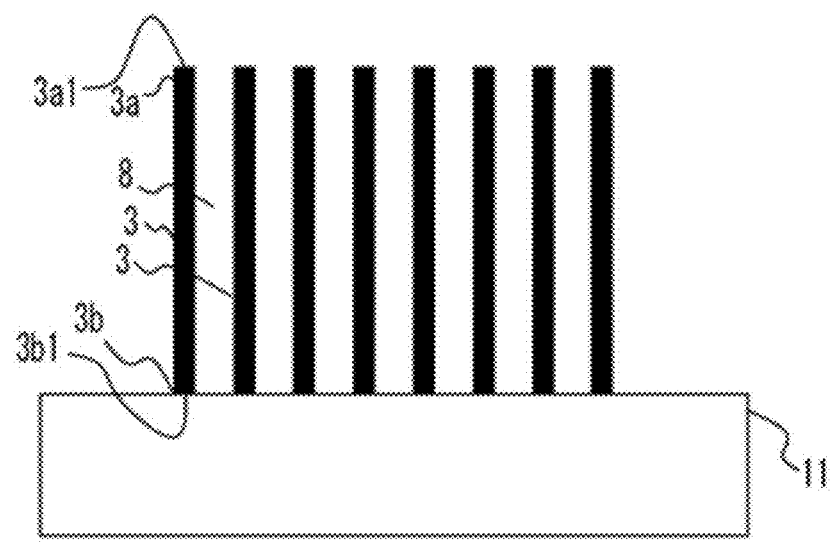

After the transfer member 11 is pressed against the CNTs 3, when the transfer member 11 is peeled off as indicated by an arrow 13 in FIG. 6A, the CNTs 3 are transferred to the transfer member 11 as illustrated in FIG. 6B.

Figure 7:
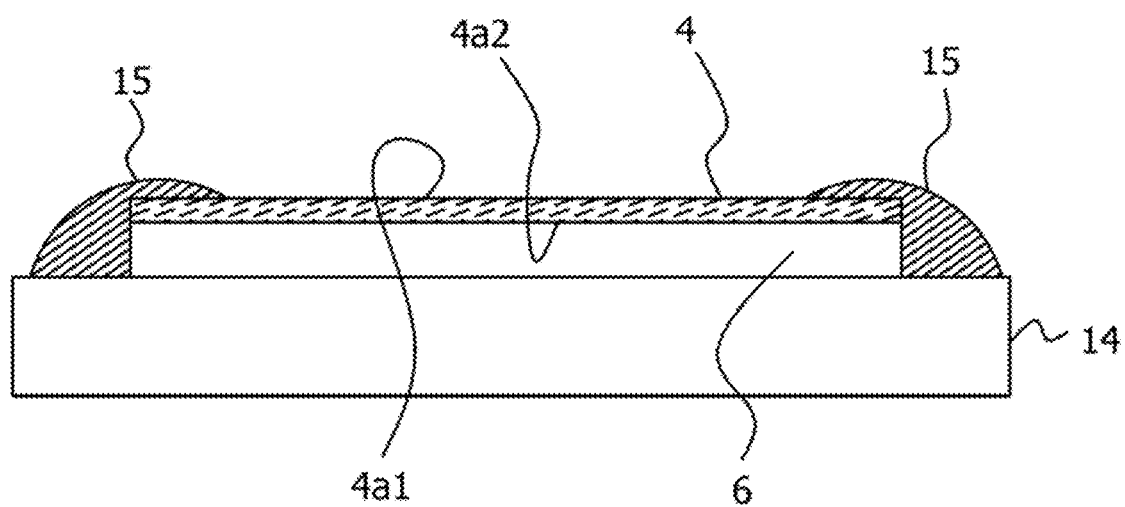
FIG. 7 illustrates a state in which a first adhesive resin having a first adhesive surface where a first release sheet is disposed is fixed over a second substrate.

Referring to FIG. 7, the first adhesive resin 4, which is an epoxy resin, is provided over a second substrate 14. The second substrate 14 is a silicon substrate. The first release sheet 6 is disposed over the first adhesive surface 4a2 of the first adhesive resin 4. The first adhesive resin 4 is disposed such that the first release sheet 6 is brought into contact with the second substrate 14 and the first adhesive resin 4 is located on the upper side. The first adhesive resin 4 is fixed over the second substrate 14 with a heat-resistant tape 15.

Figure 8:
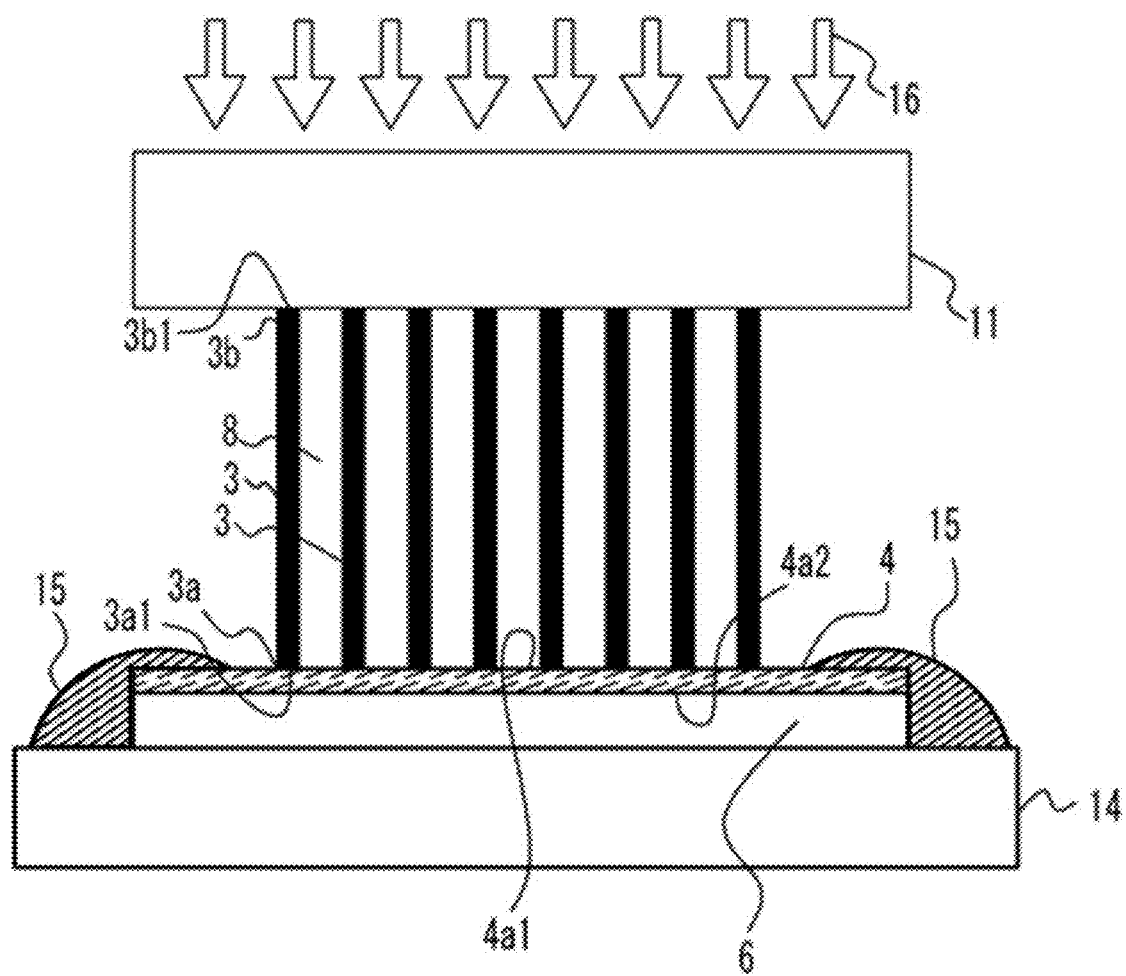
FIG. 8 is an explanatory diagram illustrating a state in which a first end surface formed at a first end of each of the plurality of linear carbon materials transferred to the transfer member is brought into contact with the first adhesive resin having the adhesive surface where the first release sheet is disposed.

Referring to FIG. 8, the CNTs 3 transferred to the transfer member 11 are disposed over the first adhesive resin 4, and are pressed toward the second substrate 14 as indicated by arrows 16. In this manner, the first end surface 3a1 of each first end 3a is brought into close contact with the first adhesive resin 4.

Figure 9:
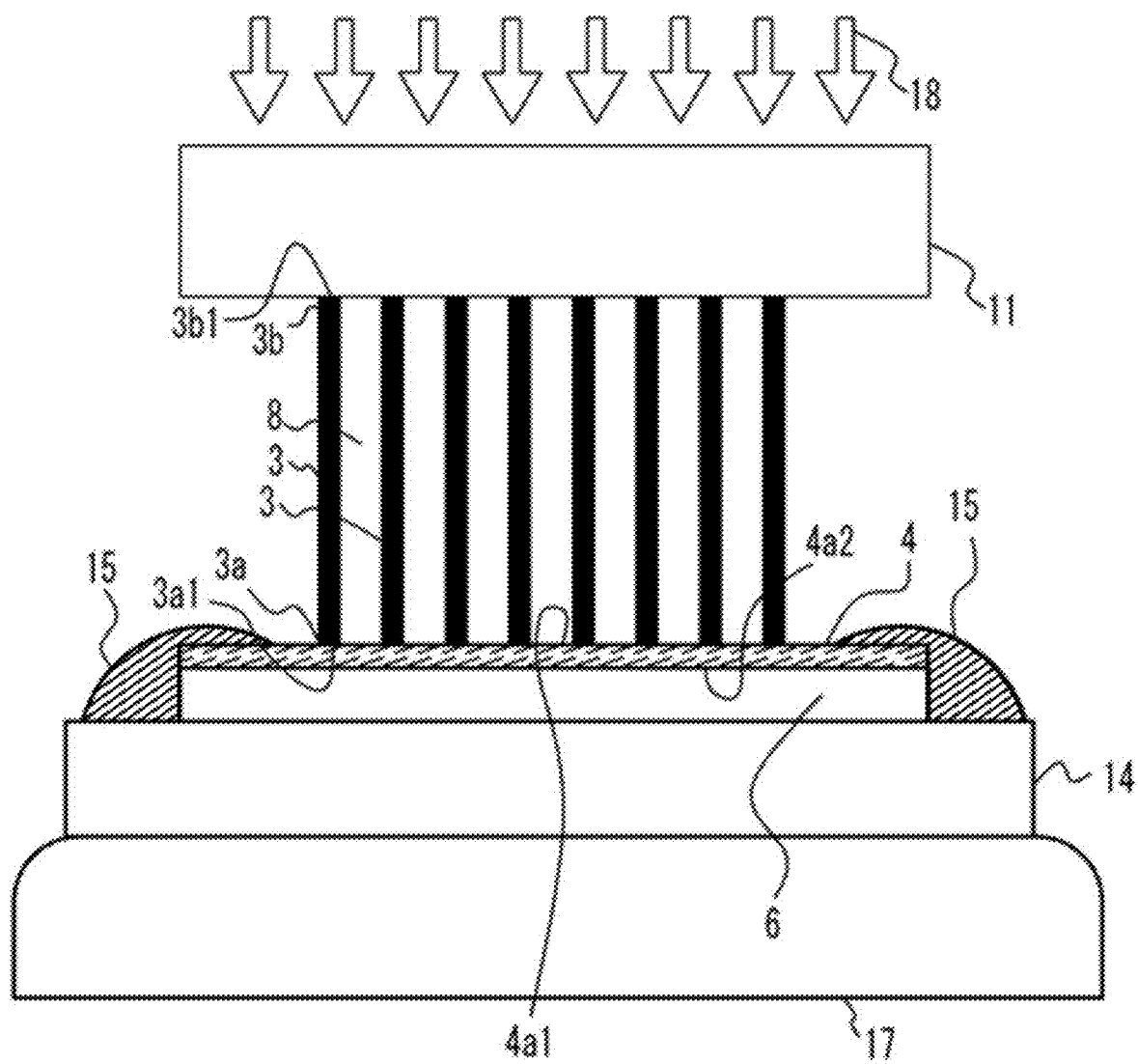
FIG. 9 is an explanatory diagram illustrating a state in which the second substrate is mounted over a hot plate.

Thereafter, as illustrated in FIG. 9, the second substrate 14 is mounted over a hot plate 17. The second substrate 14 is heated by the hot plate 17. When the second substrate 14 is heated, the first adhesive resin 4 is softened. The temperature of the hot plate 17 is adjusted such that the first adhesive resin 4 is softened to be in a low viscosity state. When the first adhesive resin 4 is softened to be in a low viscosity state, the adhesion of the first adhesive resin 4 is increased. In this state, when the transfer member 11 is pressed toward the second substrate 14 as indicated by arrows 18, the first end 3a of each CNT 3 is held by the first adhesive resin 4.

Figure 10:
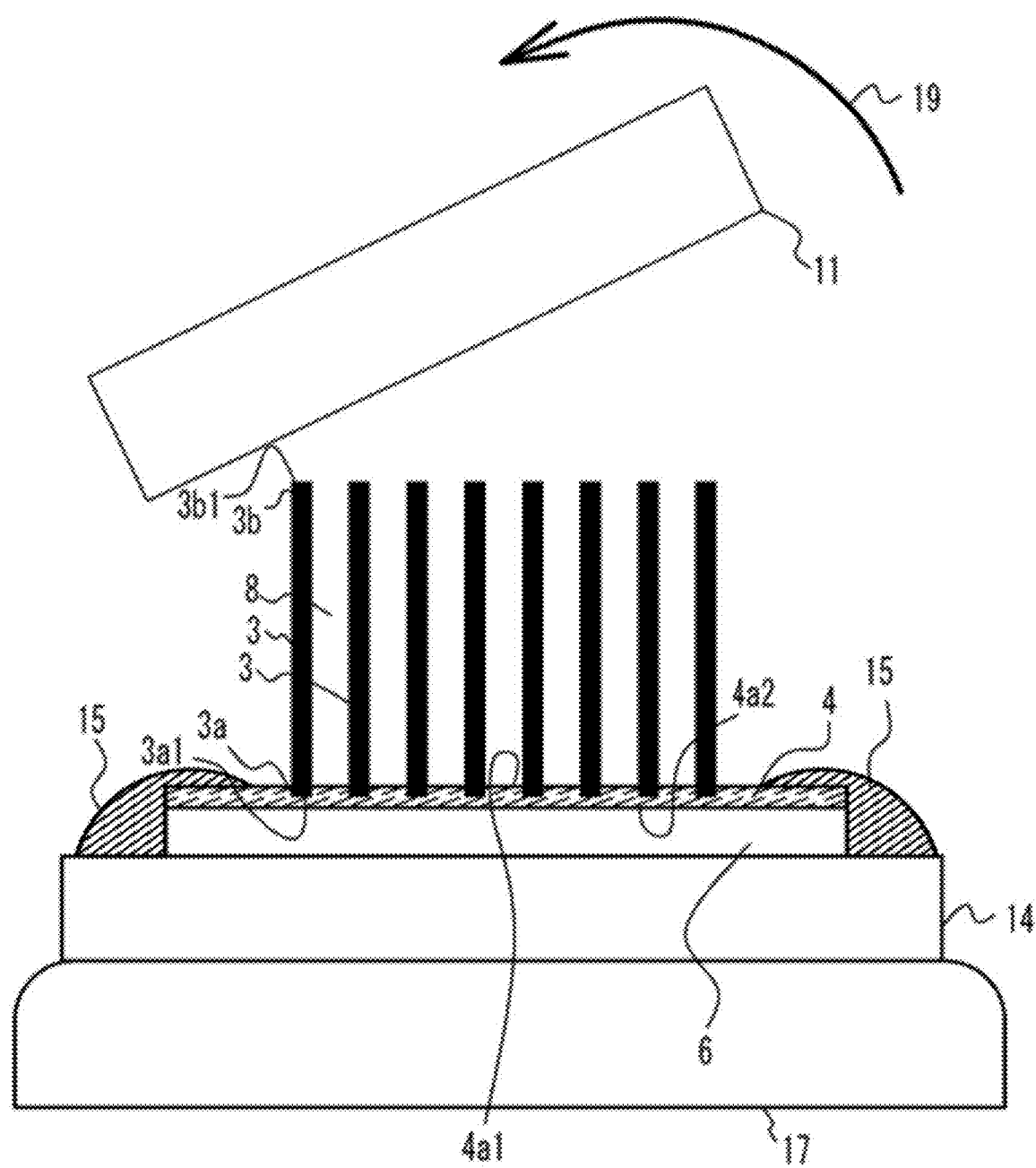
FIG. 10 is an explanatory diagram illustrating a state in which the transfer member is removed from the second end and the plurality of linear carbon materials are transferred to the first adhesive resin.

The heat of the hot plate 17 is also transferred to the transfer member 11 through the first adhesive resin 4 and the CNTs 3. In this manner, the transfer member 11 is softened and the transfer member 11 may be removed from the second ends 3b of the CNTs 3. As illustrated in FIG. 10, when the transfer member 11 is removed as indicated by an arrow 19, the plurality of CNTs 3 may be transferred to the first adhesive resin 4.

Figure 11:
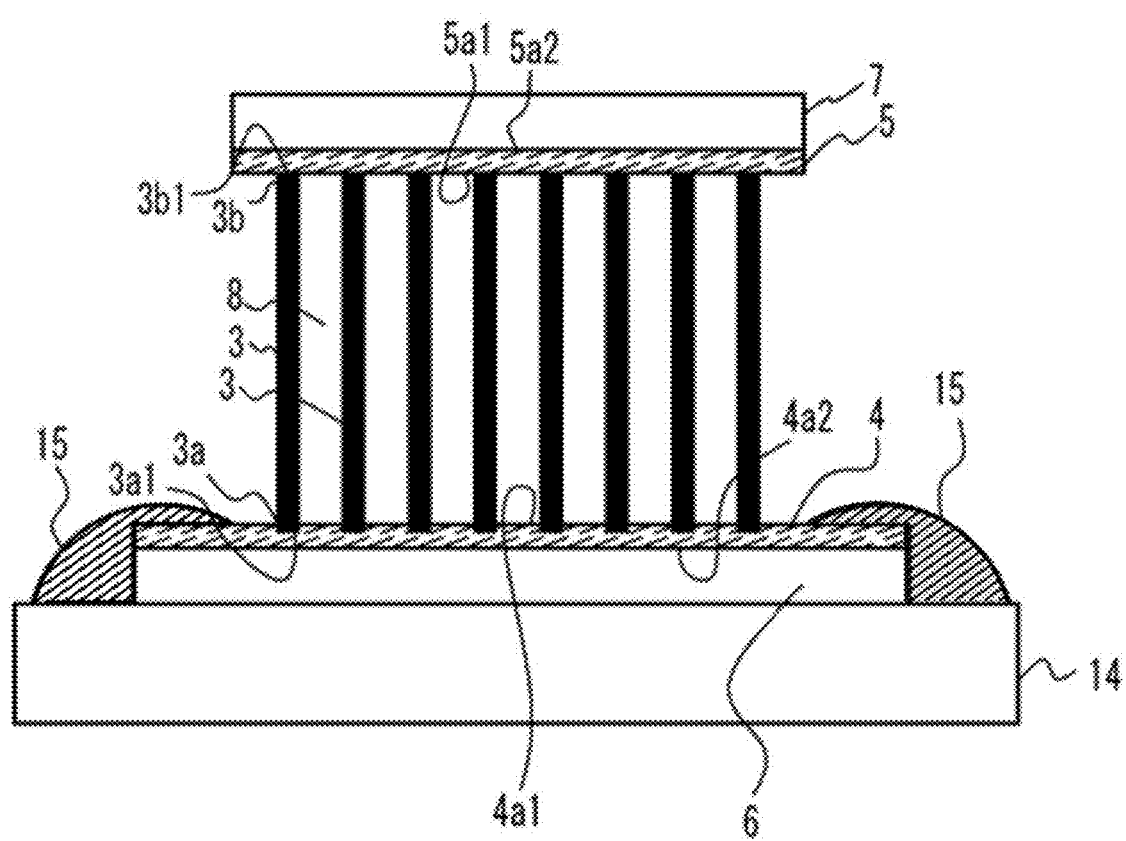
FIG. 11 is an explanatory diagram illustrating a state in which a second adhesive resin having a second adhesive surface where a second release sheet is disposed is brought into contact with a second end surface formed at a second end of each of the plurality of linear carbon materials.

Referring to FIG. 11, the second adhesive resin 5 having the second adhesive surface 5a2 where the second release sheet 7 is disposed over the second end surface 3b1 formed at the second end 3b of each CNT 3.

Figure 12:
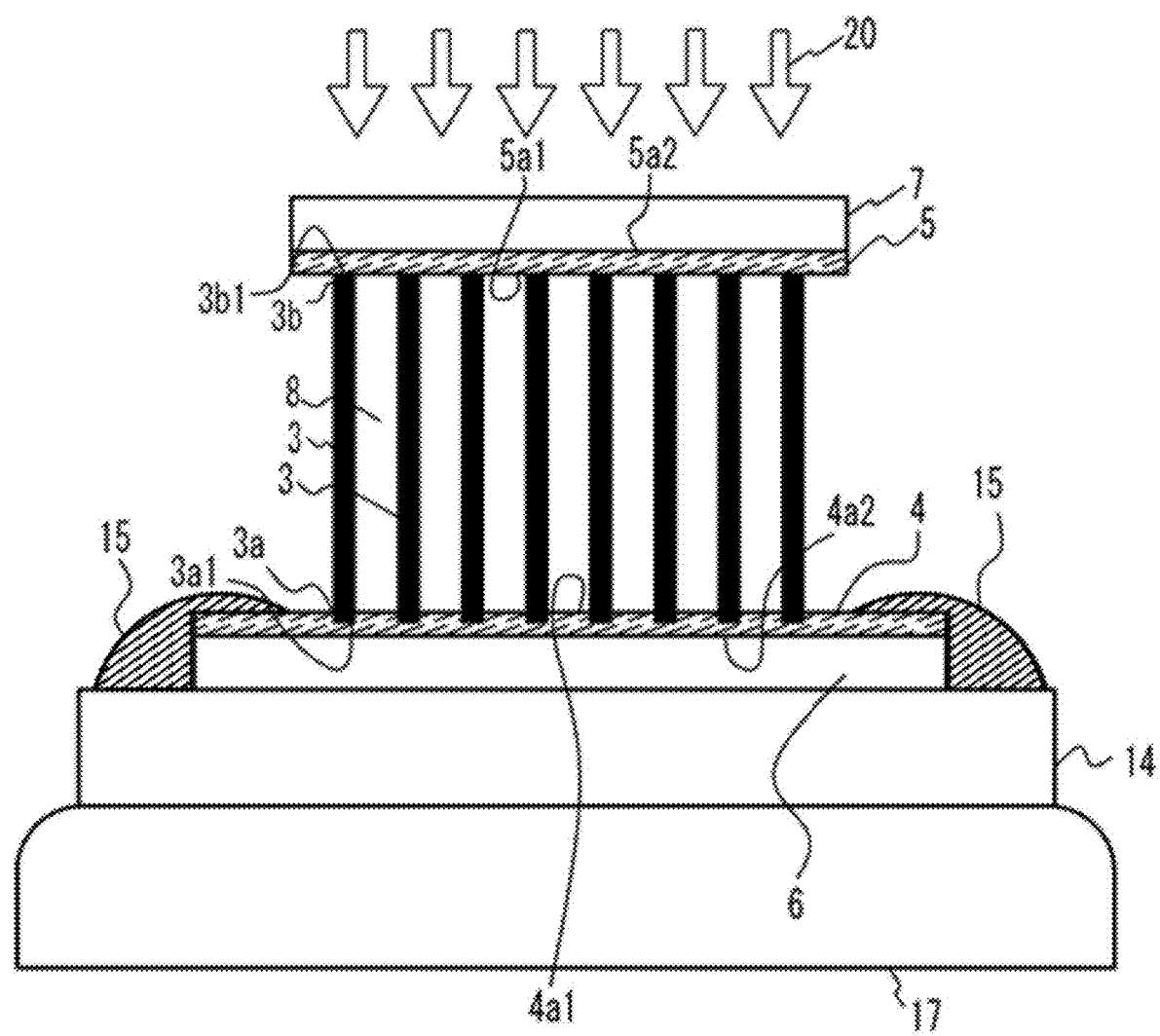
FIG. 12 is an explanatory diagram illustrating a state in which the second substrate is mounted over the hot plate and the first release sheet and the second release sheet are pressed against each other.

As illustrated in FIG. 12, the second substrate 14 is heated over the hot plate 17. The temperature at this time is the same as the temperature when the second substrate 14 is heated in FIGS. 8 to 10. The heat of the hot plate 17 is also transferred to the second adhesive resin 5 through the first adhesive resin 4 and the CNTs 3. In this manner, the second adhesive resin 5 is softened. When the second adhesive resin 5 is softened to be in a low viscosity state, the adhesion of the second adhesive resin 5 is increased. In this state, when the second adhesive resin 5 is pressed toward the second substrate 14 as indicated by arrows 20, the second end 3b of each CNT 3 is held by the second adhesive resin 5.

Figure 13:
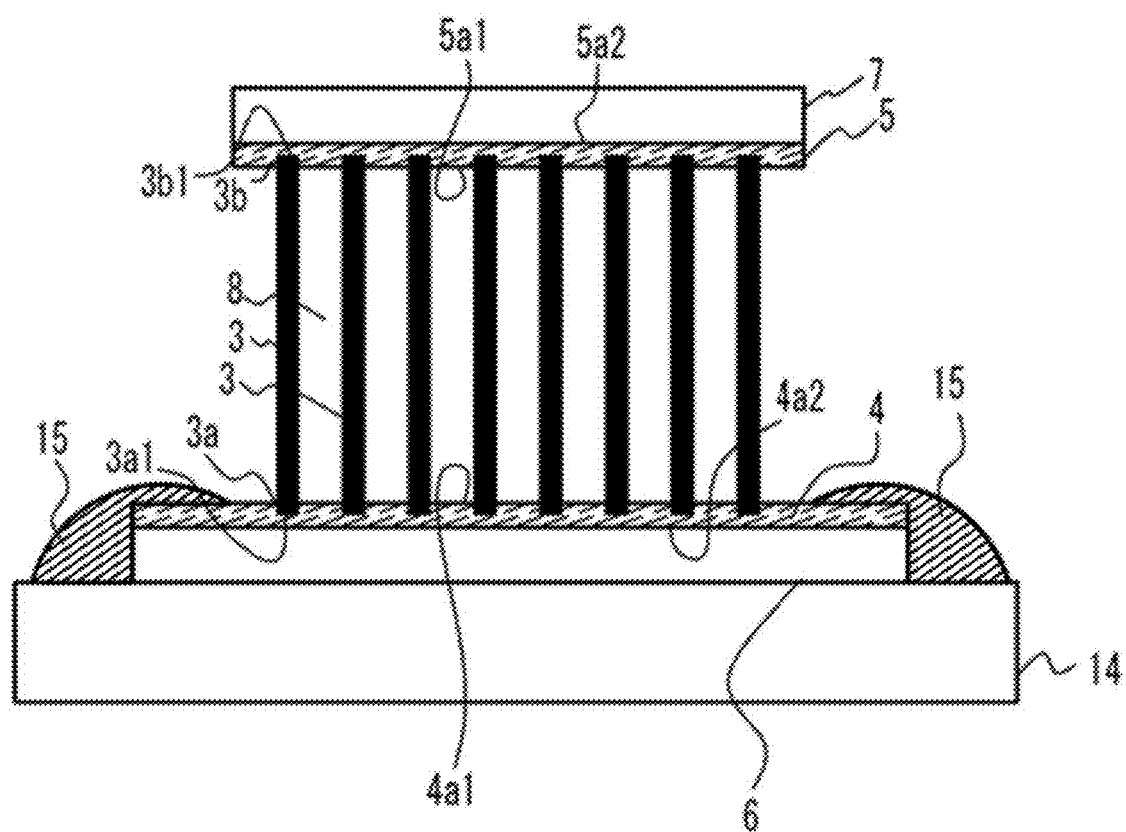
FIG. 13 is an explanatory diagram illustrating a state in which the first end of each linear carbon material enters the first adhesive resin and the second end of each linear carbon material enters the second adhesive resin.

Then, as illustrated in FIG. 13, first, the second substrate 14 is taken off of the hot plate 17, and is cooled. At this time, the first end 3a of the CNT 3 is held by the first adhesive resin 4, and the second end 3b of the CNT 3 is held by the second adhesive resin 5.

Figure 14:
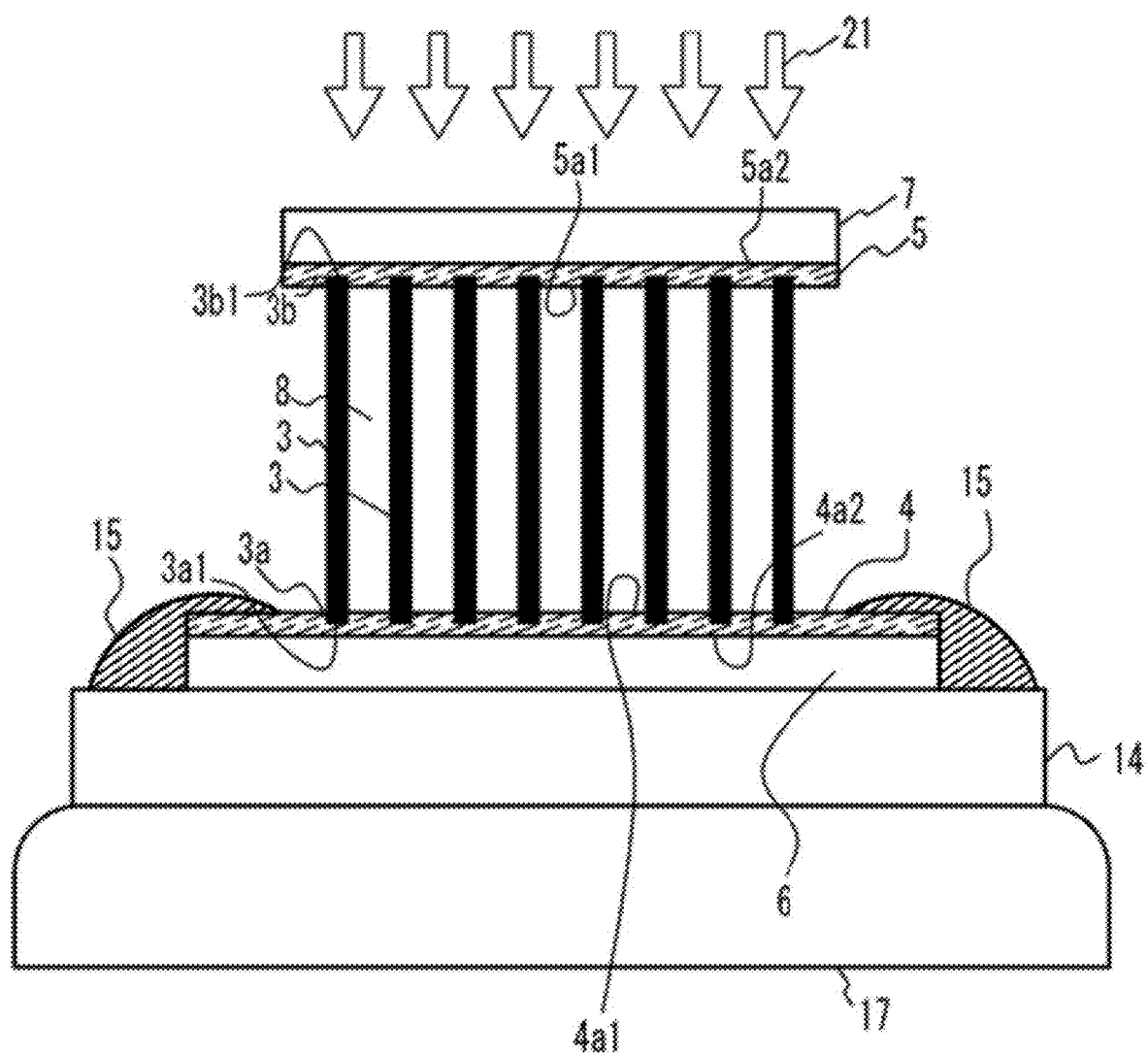
FIG. 14 is an explanatory diagram illustrating a state in which the second substrate is mounted over the hot plate, and the first release sheet and the second release sheet are pressed against each other to adjust a distance between the first end surface and the first adhesive surface and a distance between the second end surface and the second adhesive surface.

Thereafter, as illustrated in FIG. 14, the second substrate 14 is mounted over the hot plate 17 again, and the second substrate 14 is heated. Although the heat of the hot plate 17 is also transferred to the first adhesive resin 4 and the second adhesive resin 5, the temperature of each of the first adhesive resin 4 and the second adhesive resin 5 is set to be higher than that when the second substrate 14 is heated in FIGS. 8 to 10, 12, and 13. The hot plate 17 may be provided over the second release sheet 7.

In this manner, the first adhesive resin layer 4a is formed between the first end surface 3a1 and the first adhesive surface 4a2 by adjusting the distance between the first end surface 3a1 and the first adhesive surface 4a2 while adjusting the temperature of the first adhesive resin 4. The second adhesive resin layer 5a is formed between the second end surface 3b1 and the second adhesive surface 5a2 by adjusting the distance between the second end surface 3b1 and the second adhesive surface 5a2 while adjusting the temperature of the second adhesive resin 5.

The temperature of each of the first adhesive resin 4 and the second adhesive resin 5 is adjusted because the distance between the first end surface 3a1 and the first adhesive surface 4a2 and the distance between the second end surface 3b1 and the second adhesive surface 5a2 have a correlation with the temperature.

Figure 15:
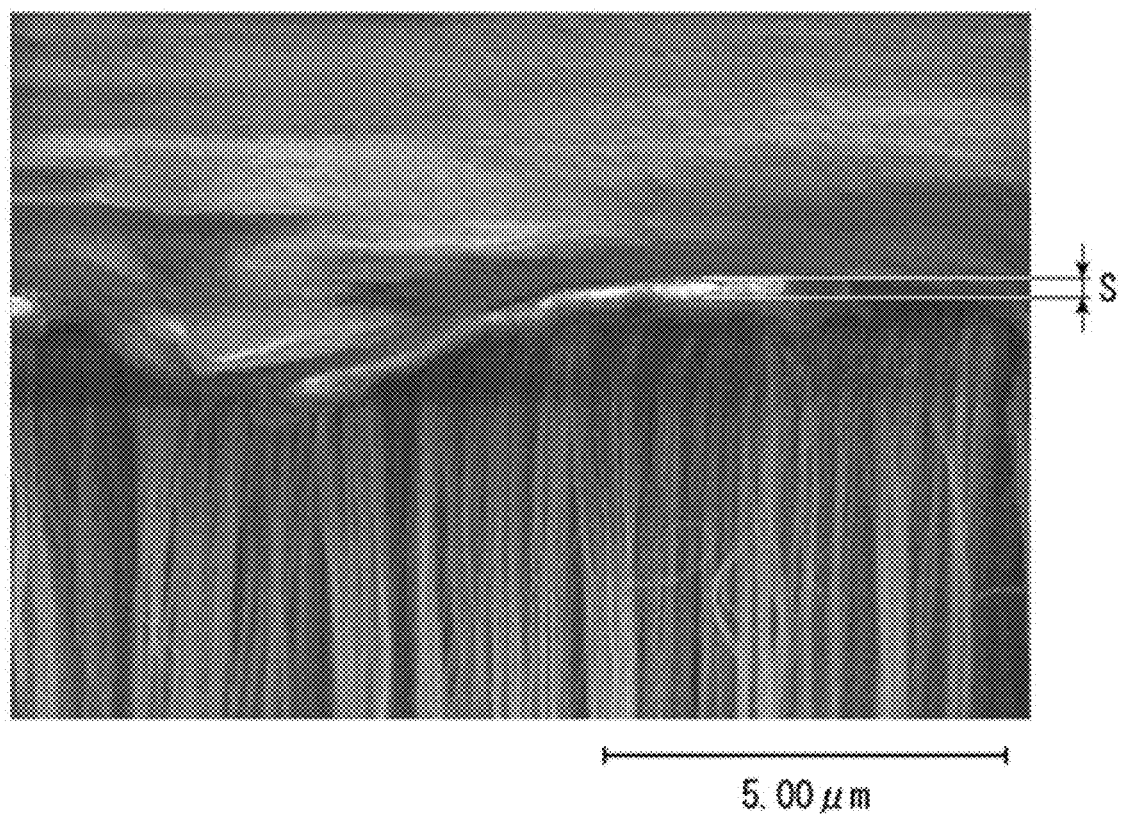
FIG. 15 is a photograph illustrating an adhesive resin layer in a case where the first release sheet and the second release sheet are pressed against each other at an appropriate temperature.
Figure 16:
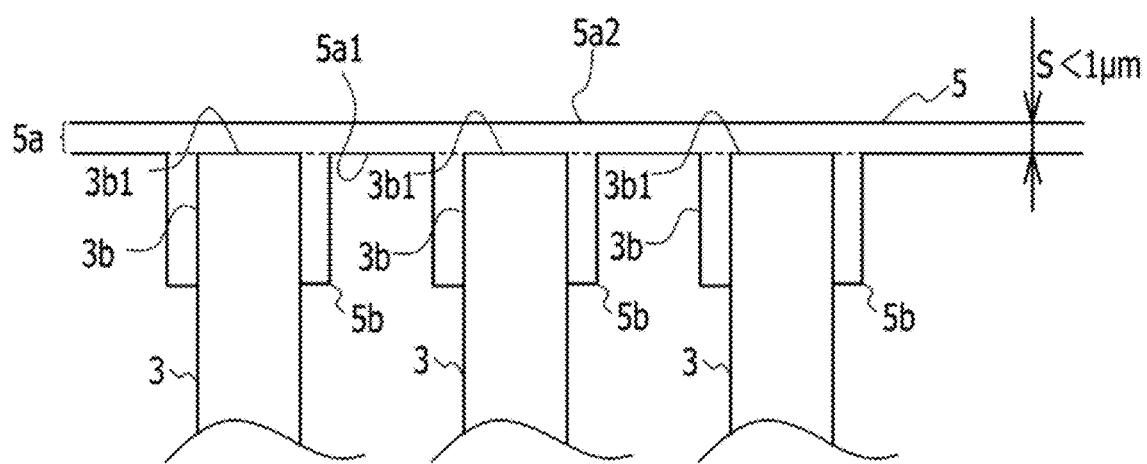
FIG. 16 is an explanatory diagram schematically illustrating a state illustrated in FIG. 15.

Referring to FIGS. 15 and 16, when the second adhesive resin 5 is heated to an appropriate temperature and is pressed as indicated by arrows 21 in FIG. 14, a second adhesive resin layer 5a having a thickness S of less than 1 μm is formed. In accordance with this, the second adhesive resin enters between the CNTs 3 by capillary phenomenon to form the embedded portion 5b continuous with the second adhesive resin layer 5a, and the second end 3b of the CNT 3 is embedded and fixed in the embedded portion 5b. It is considered that the thickness S may be set to be less than 1 μm because the second adhesive resin 5 is heated to an appropriate temperature and is appropriately softened to have a low viscosity, so that the second end 3b of the CNT 3 is appropriately inserted into the softened second adhesive resin 5.

Although the second adhesive resin 5 is illustrated in FIGS. 15 and 16 for convenience of description, the same phenomenon occurs in the first adhesive resin 4 so that the first adhesive resin layer 4a is formed and the embedded portion 4b is formed. The first end 3a is embedded and fixed in the embedded portion 4b.

Figure 17:
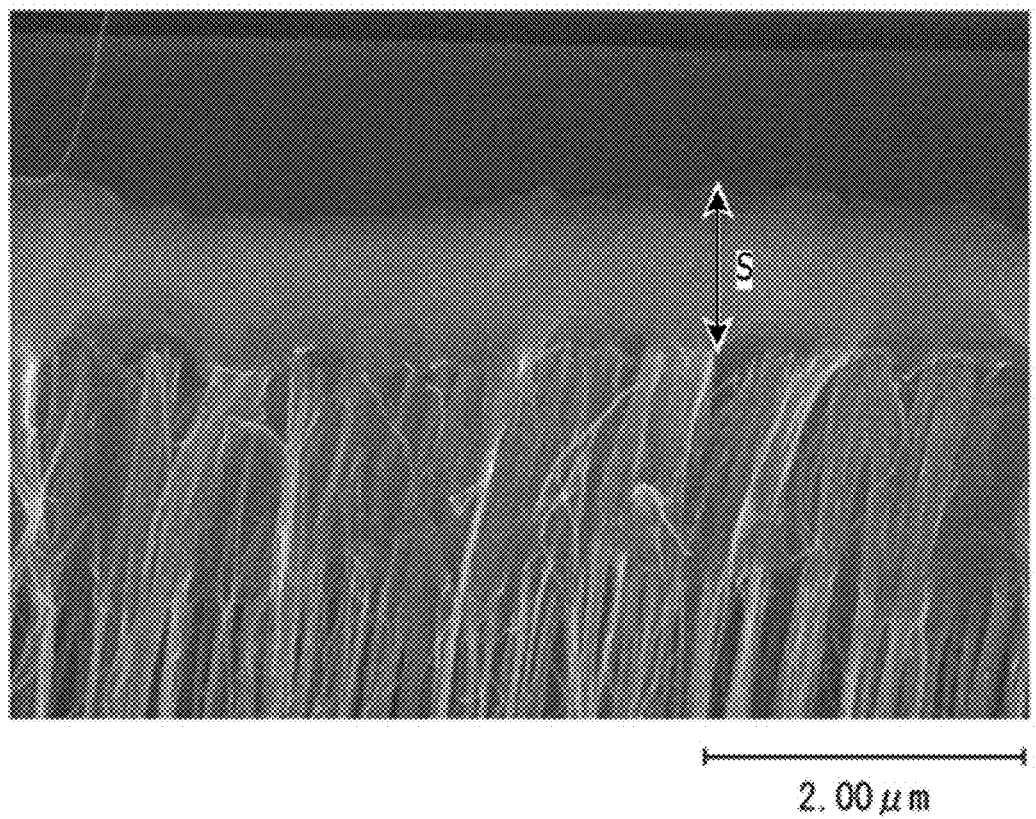
FIG. 17 is a photograph illustrating an adhesive resin layer in a case where the first release sheet and the second release sheet are pressed against each other at a temperature lower than the appropriate temperature.
Figure 18:
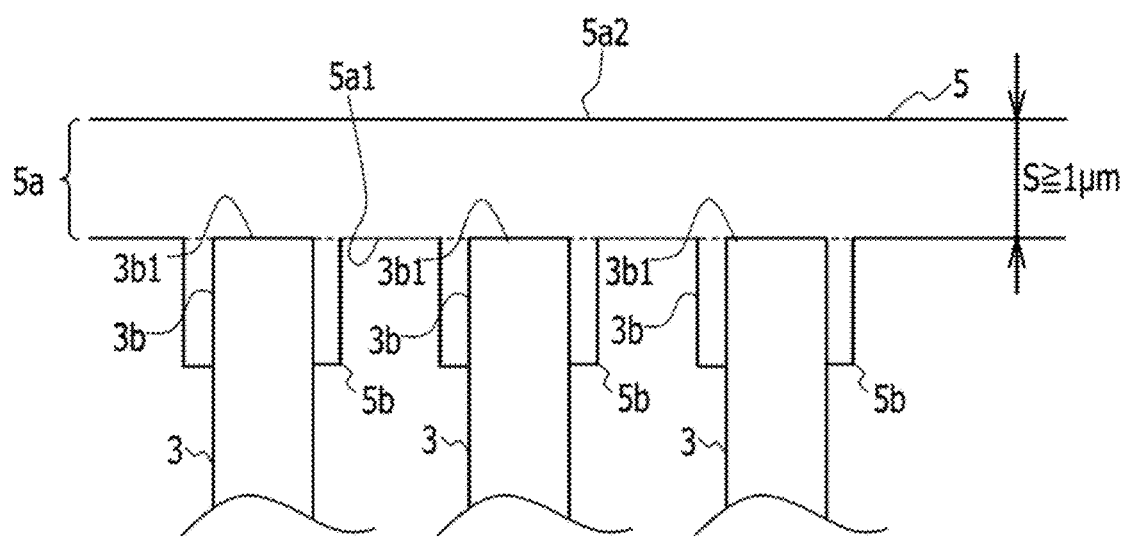
FIG. 18 is an explanatory diagram schematically illustrating a state illustrated in FIG. 17.

On the other hand, referring to FIGS. 17 and 18, when the second adhesive resin 5 is heated to a temperature lower than the appropriate temperature and is pressed as indicated by arrows 21 in FIG. 14, the thickness S becomes 1 μm or more. It is considered that this is because when the temperature of the second adhesive resin 5 is low, the second adhesive resin 5 is not easily softened, and the second end 3b of the CNT 3 is not inserted into an appropriate position of the second adhesive resin 5 even when being pressed. The same applies to the first adhesive resin 4.

Figure 19:
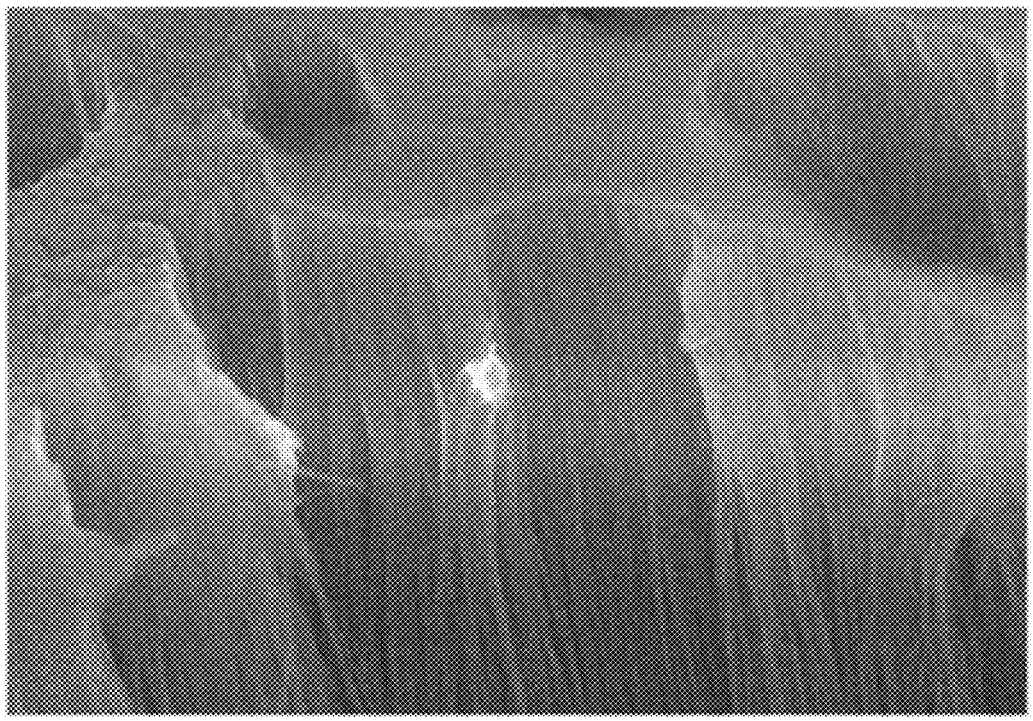
FIG. 19 is a photograph illustrating an adhesive resin layer in a case where the first release sheet and the second release sheet are pressed against each other at a temperature higher than the appropriate temperature.
Figure 20:
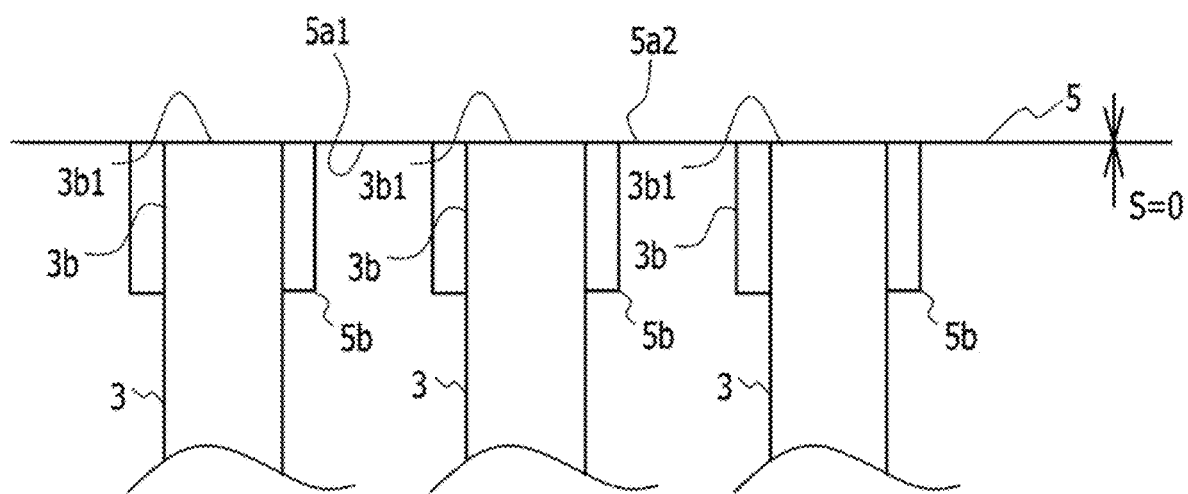
FIG. 20 is an explanatory diagram schematically illustrating a state illustrated in FIG. 19.

Referring to FIGS. 19 and 20, when the second adhesive resin 5 is heated to a temperature higher than the appropriate temperature and is pressed as indicated by arrows 21 in FIG. 14, aggregation occurs on the second end surface 3b1 side to form a gap on the second adhesive surface. For example, the thickness S of the adhesive surface approaches 0. As a result, the second adhesive resin layer 5a is not appropriately formed. When the second end surface 3b1 is exposed to the second adhesive surface 5a2 in this manner, the adhesiveness of the second adhesive surface 5a2 may be impaired. The same applies to the first adhesive resin 4.

In this manner, the first adhesive resin layer 4a and the second adhesive resin layer 5a each of which the thickness S is less than 1 μm may be formed by pressing the first adhesive resin 4 and the second adhesive resin 5 while adjusting the temperature of each of the first adhesive resin 4 and the second adhesive resin 5. It is possible to realize favorable thermal conductivity of the heat dissipation sheet 100 by setting the thickness S of each of the first adhesive resin layer 4a and the second adhesive resin layer 5a to be less than 1 μm.

When the heat-resistant tape 15 is removed after the step illustrated in FIG. 14 is performed, the heat dissipation sheet 100 of the present embodiment illustrated in FIG. 1 may be obtained.

Figure 21:
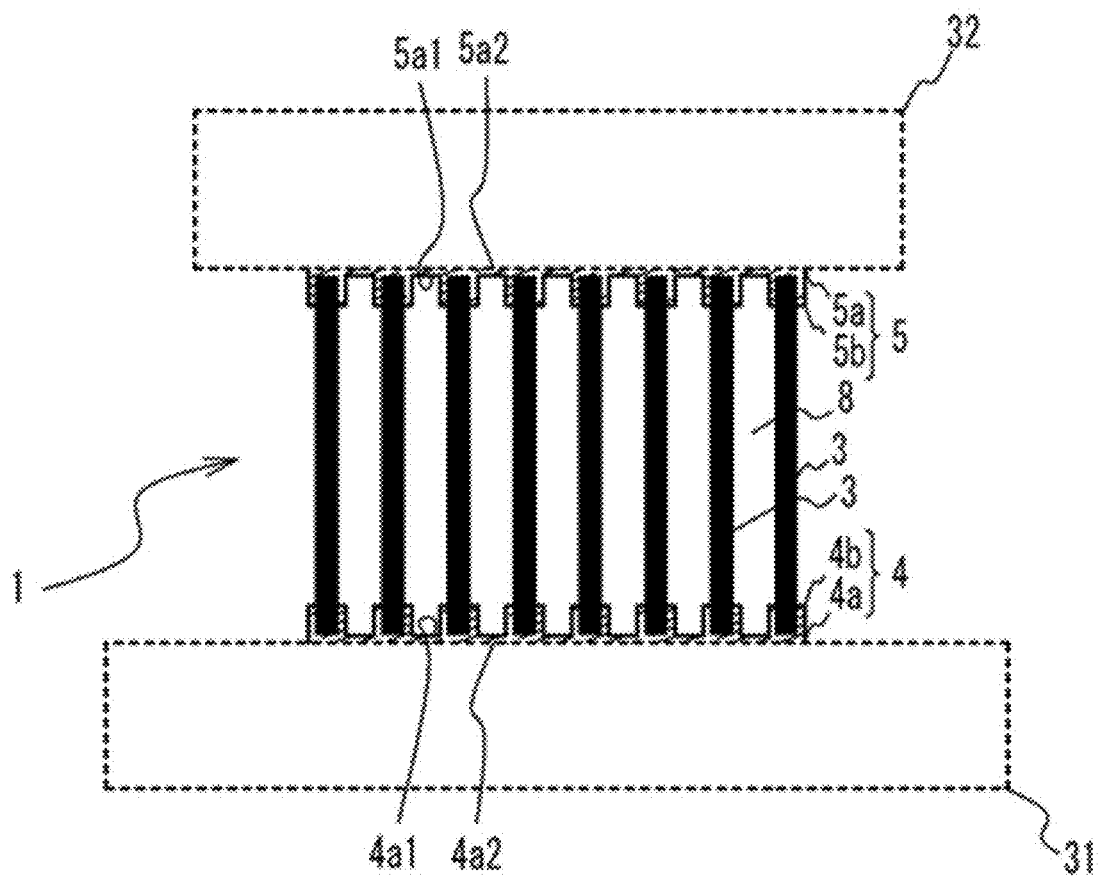
FIG. 21 is an explanatory diagram illustrating a use state of the heat dissipation sheet of the embodiment.

Referring to FIG. 21, the use state of the heat dissipation sheet 100 of the embodiment will be described. When the heat dissipation sheet 100 is used, the first release sheet 6 and the second release sheet 7 are removed, and the heat dissipation sheet body 1 is disposed between the heating element 31 and the heat dissipation element 32 and is bonded therewith. For example, a user peels off one of the first release sheet 6 and the second release sheet 7, temporarily bonds the heat dissipation sheet body 1 to the heat dissipation element 32, peels off the other release sheet, fits the heat dissipation sheet body 1 to the heating element 31, and performs thermocompression bonding. In this manner, the heat dissipation element 32 may be fixed to the heating element 31. The thickness S of the adhesive resin layer after the thermocompression bonding is preferably 30 nm or less. As described above, according to the present embodiment, the work of mounting the heat dissipation element 32 is easy and the heat dissipation sheet has excellent handleability and may be cut, the heat dissipation sheet may cope with the size and shape of the adherent, and may satisfy the demanded thermal conductivity, followability to a heat cycle, and heat resistance.

Although the preferred embodiments of the present disclosure have been described in detail above, the present disclosure is not limited to the particular embodiments, and various modifications and changes may be made within the scope of the gist of the present disclosure described in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A heat dissipation sheet to be provided between a heating element and a heat dissipation element, the heat dissipation sheet comprising:
   a carbon material layer configured to include a plurality of linear carbon materials arranged in parallel with each other;
   a first adhesive resin layer configured to include a first surface and a second surface on a side opposite to the first surface, a first end surface of each of the plurality of linear carbon materials contacting on the first surface; and
   a second adhesive resin layer configured to include a third surface and a fourth surface on a side opposite to the third surface, the fourth surface contacting on a second end surface of each of the plurality of linear carbon materials;
   each of the first adhesive resin layer and the second adhesive resin layer holds each of the plurality of liner carbon materials, and
   the linear carbon materials are arrangeable with the heating element through the first adhesive resin layer when the second surface contacts on the heating element, and the linear carbon materials are arrangeable with the heat dissipation element through the second adhesive resin layer when the dissipation element contacts on the third surface.

2. The heat dissipation sheet according to claim 1, wherein the carbon material layer includes a gap provided between the linear carbon materials.

3. The heat dissipation sheet according to claim 1, wherein the plurality of linear carbon materials are provided with a surface density of $1 \times 10^{10}$ pieces/cm$^2$ or more.

4. The heat dissipation sheet according to claim 1, wherein each of the first end surface and the second end surface is embedded continuously in a plurality of gaps provided in each of the first adhesive resin layer and the second adhesive resin layer, respectively, each of the first end surface and the second end surface contacting on the plurality of gaps.

5. The heat dissipation sheet according to claim 1, further comprising:
   a first release sheet to be arranged under the second surface; and
   a second release sheet to be arranged on the third surface.

6. The heat dissipation sheet according to claim 1, wherein a thickness of each of the first adhesive resin layer and the second adhesive resin layer is 200 nm to 800 nm.

* * * * *